(12) United States Patent
Parthasarathy et al.

(10) Patent No.: US 9,026,519 B2
(45) Date of Patent: May 5, 2015

(54) CLUSTERING WEB PAGES ON A SEARCH ENGINE RESULTS PAGE

(75) Inventors: Sasi Kumar Parthasarathy, Seattle, WA (US); Junaid Ahmed, Bellevue, WA (US); Yatharth Saraf, Bellevue, WA (US); Walter Sun, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 878 days.

(21) Appl. No.: 13/205,809

(22) Filed: Aug. 9, 2011

(65) Prior Publication Data
US 2013/0041877 A1 Feb. 14, 2013

(51) Int. Cl.
*G06F 17/30* (2006.01)

(52) U.S. Cl.
CPC ...... *G06F 17/30864* (2013.01); *G06F 17/3071* (2013.01)

(58) Field of Classification Search
USPC .......................... 707/709, 726–729, 737, 749
See application file for complete search history.

(56) References Cited

U.S. PATENT DOCUMENTS

| | | | |
|---|---|---|---|
| 6,182,133 B1 * | 1/2001 | Horvitz | 709/223 |
| 7,333,985 B2 | 2/2008 | Weare | |
| 7,636,730 B2 | 12/2009 | Sanfilippo | |
| 7,676,465 B2 | 3/2010 | Poola | |
| 7,707,229 B2 | 4/2010 | Tiyyagura | |
| 8,346,620 B2 * | 1/2013 | King et al. | 705/26.1 |
| 2002/0065857 A1 | 5/2002 | Michalewicz et al. | |
| 2002/0161800 A1 | 10/2002 | Eld et al. | |
| 2003/0061515 A1 * | 3/2003 | Kindberg et al. | 713/201 |
| 2004/0199497 A1 * | 10/2004 | Timmons | 707/3 |
| 2005/0246358 A1 * | 11/2005 | Gross | 707/100 |
| 2005/0246391 A1 * | 11/2005 | Gross | 707/200 |
| 2006/0010029 A1 * | 1/2006 | Gross | 705/10 |
| 2006/0117002 A1 | 6/2006 | Swen | |
| 2006/0206796 A1 * | 9/2006 | Kausik et al. | 715/500 |
| 2006/0235841 A1 * | 10/2006 | Betz et al. | 707/5 |

(Continued)

FOREIGN PATENT DOCUMENTS

EP   2284726 A1   2/2011

OTHER PUBLICATIONS

PCT Search Report mailed Feb. 25, 2013 Application No. PCT/US2012/049082; 10 pages.

(Continued)

*Primary Examiner* — Hanh Thai
(74) *Attorney, Agent, or Firm* — Dave Ream; Doug Barker; Micky Minhas

(57) ABSTRACT

Methods, systems, and media are provided for delivering clustered search results for recent and non-recent events by maintaining the identification (ID) numbers of the respective clustered documents beyond the "fresh" life span of the clustered documents. When clusters are formed according to similar content, an ID number and associated attributes are assigned to each of the clusters. This provides a mechanism to track and retrieve the respective clusters for subsequent delivery of search results. The respective ID numbers of the clusters are maintained, even after the documents are no longer considered "fresh." These similar-content clusters are further subdivided according to publication date. This provides individual subdivided clusters for similar content events that occurred at different time spans, which are delivered along with individual non-clustered search results in a SERP.

19 Claims, 7 Drawing Sheets

(56) References Cited

U.S. PATENT DOCUMENTS

| | | | |
|---|---|---|---|
| 2009/0024574 A1* | 1/2009 | Timmons | 707/3 |
| 2009/0043797 A1 | 2/2009 | Dorie et al. | |
| 2009/0070346 A1 | 3/2009 | Savona et al. | |
| 2009/0313228 A1 | 12/2009 | Grandhi et al. | |
| 2010/0082367 A1* | 4/2010 | Hains et al. | 705/2 |
| 2010/0169311 A1* | 7/2010 | Tengli et al. | 707/736 |
| 2010/0205168 A1* | 8/2010 | Yang et al. | 707/709 |
| 2011/0078131 A1* | 3/2011 | Wen et al. | 707/711 |
| 2012/0284275 A1* | 11/2012 | Vadrevu et al. | 707/738 |

OTHER PUBLICATIONS

Clustering and exploring search results using timeline constructions—Published Date: Nov. 2-6, 2009 http://ants.iis.sinica.edu.tw/3BkMJ9lTeWXTSrrvNoKNFDxRm3zFwRR/87/%28CIKM09%29Clustering%20and%20exploring%20search%20results%20using%20timeline%20constructions.pdf.

Design and Implementation of Timeline Application for News Documents—Published Date: Dec. 12, 2007 http://etd.ohiolink.edu/send-pdf.cgi/Shaik%20Mastan.pdf?wright1197674770.

ImprovingWeb-based Image Search via Content Based Clustering—Published Date: Jun. 17-22, 2006 http://ieeexplore.ieee.org/stamp/stamp.jsp?tp=&arnumber=1640549.

Learning to Cluster Web Search Results—Published Date: Jul. 25-29, 2004 http://www.google.co.in/url?sa=t&source=web&cd=1&ved=0CCcQFjAA&url=http%3A%2F%2Fciteseerx.ist.psu.edu%2Fviewdoc%2Fdownload%3Fdoi%3D10.1.1.1.2851%26rep%3Drep1%26type%3Dpdf&rct=j&q=Learning%20to%20Cluster%20Web%20Search%20Results%20&ei=cQ65TcfwH4io8AOblow9&usg=AFQjCNFTaUocYquhVBAUHK4S7AUd02vv4A&cad=rja.

Evaluating Contents-Link Coupled Web Page Clustering for Web Search Results—Published Date: Nov. 4-9, 2002 http://citeseerx.ist.psu.edu/viewdoc/download?doi=10.1.1.90.6242&rep=rep1&type=pdf.

* cited by examiner

SERP – CARD TOP

CHINA PLANE CRASH

ALL RESULTS                    1-10 OF 24,500 RESULTS - ADVANCED

ADVERTISEMENT TITLE                        SPONSORED SITE
ATTRIBUTION.COM – LUCTUS ID HENDRERIT UT, AUCTOR EGET MET

PLANE CRASH IN TIBET IS SHROUDED IN MYSTERY

LOREM IPSUO ALIQUET LOBORM DOLOR SIT AMET ADIPISCING ELIT PRAESM POSUERE LEO ALIQUET ENT PLACERAT TINDICUNT ENIM. IN VEL QUALOBORTIS ET IN BASKH GRALE ET AL SIGM LIBERO TINDICUNT ENIM. AMESO IPSUM
NEW YORK TIMES – 1 DAY AGO REPORT: PASSENGER PLANE CRASHES IN TIBET LA TIMES – 1 DAY AGO
PASSENGER PLANE CRASHES IN TIBET PHILADELPHIA LOCAL NEWS – 1 DAY AGO
SEE ALSO: 4 RELATED ARTICLES

PLANE CRASH IN CHINA KILLS 3 AMERICANS

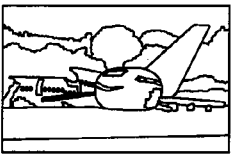
LOREM IPSUO ALIQUET LOBORM DOLOR SIT AMET.ADIPISCING ELIT PRAESM POSUERE LEO ALIQUET ENT PLACERAT TINDICUNT ENIM. IN VEL QUALOBORTIS ET IN BASKH GRALE ET AL SIGM LIBERO TINDICUNT ENIM. AMESO IPSUM
NEW YORK TIMES – 1 DAY AGO THRE AMERICANS KILLED IN A PLANE CRASH IN CHINA LA TIMES – 1 MONTH AGO
CHINA PLANE CRASH: 42 KILLED, 3 AMERICANS NEW YORK TIMES – 1 MONTH AGO
3 AMERICANS DEAD IN CHINA PLANE CRASH PHILADELPHIA NEWS – 1 MONTH AGO
CHINA: 42 DEAD FROM PLANE CRASH: 49 RESCUED CBS NEWS – 1 MONTH AGO ALGO TITLE LOREM IPSUM DOLOR
ALGO TITLE LOREM IPSUM DOLOR SIT AMET.ADIPISCING ELIT PRAESENT PLACERAT TINDICUNT ENIM. IN VE QUAM POSUERE LEO ALIQUET LOBORTIS ET IN LIBERO. MAURIS AT FAUCIBUS ENIM.
NEW YORK TIMES ALGO TITLE LOREM IPSUM
ALGO TITLE LOREM IPSUM DOLOR SIT AMET.ADIPISCING ELIT PRAESENT PLACERAT TINDICUNT ENIM.
BBC NEWS ALGO TITLE LOREM IPSUM DOLOR
ALGO TITLE LOREM IPSUM DOLOR SIT AMET.ADIPISCING ELIT PRAESENT PLACERAT TINDICUNT ENIM. IN VE QUAM POSUERE LEO ALIQUET LOBORTIS ET IN LIBERO. MAURIS AT FAUCIBUS ENIM.
HUFFINGTON POST ALGO TITLE LOREM IPSUM
ALGO TITLE LOREM IPSUM DOLOR SIT AMET.ADIPISCING ELIT PRAESENT PLACERAT TINDICUNT ENIM.
LA TIMES ALGO TITLE LOREM IPSUM DOLOR
ALGO TITLE LOREM IPSUM DOLOR SIT AMET.ADIPISCING ELIT PRAESENT PLACERAT TINDICUNT ENIM. IN VE QUAM POSUERE LEO ALIQUET LOBORTIS ET IN LIBERO. MAURIS AT FAUCIBUS ENIM.
NEW YORK TIMES

*FIG. 6.*

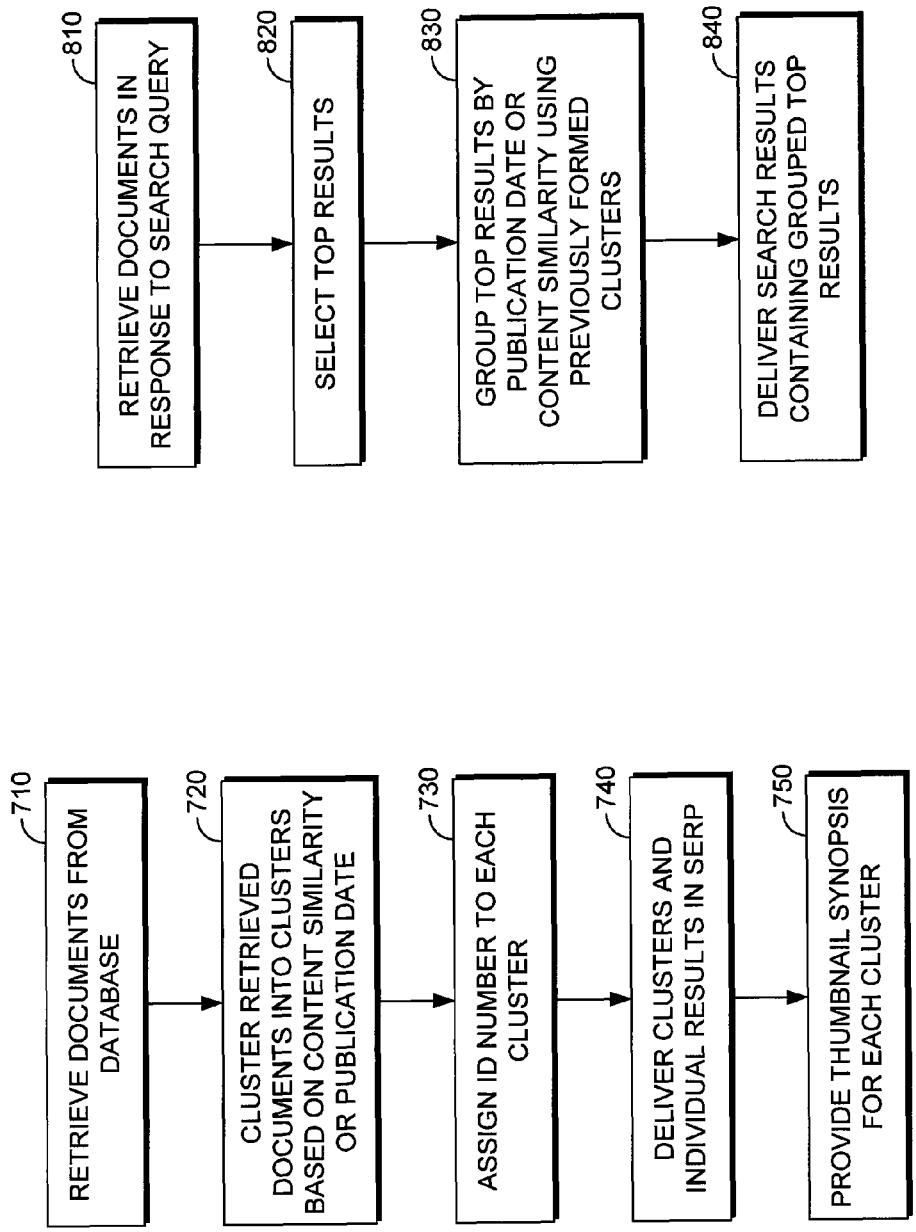

CLUSTERING WEB PAGES ON A SEARCH ENGINE RESULTS PAGE

BACKGROUND

Data may be stored in an electronic form for use with computerized techniques. A large amount of computerized data used in connection with a variety of different applications presents a challenge for how to locate and organize relevant information. Clustering refers to the process of classifying a set of data objects, such as documents included in the computerized data, into groups so that each group includes similar objects and objects belonging to other groups are dissimilar.

Clustering provides a means of grouping fresh documents together when there is a large volume of information or news concerning a specific topic. A summary or abstract of the cluster is displayed, along with links to documents within the cluster and other pertinent information, in a search engine results page (SERP). A fresh document is a document concerning a recent topic or subject of interest. After a short period of time, a document is no longer considered a fresh document. Documents are clustered when they are fresh, and they are provided with identification numbers. This information remains with the document to help discern this cluster from a new cluster on a similar topic.

Techniques for clustering objects include, but are not limited to a hierarchical clustering approach or a partitional approach. Hierarchical algorithms proceed successively by either merging smaller clusters into larger ones, or by splitting larger clusters into smaller clusters. In contrast, partitional algorithms determine all clusters at once by decomposing the data set into a set of disjoint clusters. Hierarchical clustering algorithms can be further described as either a divisive method (i.e., top-down) or an agglomerative method (i.e., bottom-up). A divisive algorithm begins with the entire set and recursively partitions that data set into two (or more) pieces, forming a tree. An agglomerative algorithm starts with each object in its own cluster and iteratively merges clusters.

SUMMARY

Embodiments of the invention are defined by the claims below. A high-level overview of various embodiments is provided to introduce a summary of the systems, methods, and media that are further described in the detailed description section below. This summary is neither intended to identify key features or essential features of the claimed subject matter, nor is it intended to be used as an aid in isolation to determine the scope of the claimed subject matter.

Systems, methods, and computer-readable storage media are described for delivering clustered search results for recent and non-recent events. The identification numbers of the respective clusters are maintained beyond the "fresh" life span of the clustered documents, through the life of the respective documents or for any other designated time period. These long-term clusters are further divided into one or more clusters according to publication date. As a result, non-fresh documents continue to be clustered, but are also divided by publication date to separate similar events according to different timelines.

BRIEF DESCRIPTION OF THE DRAWINGS

Illustrative embodiments of the invention are described in detail below, with reference to the attached drawing figures, which are incorporated by reference herein, and wherein:

FIG. 6 is an illustration of a search engine results page used in accordance with embodiments of the invention;

FIG. 7 is a flowchart of a method of delivering persistent clusters, the instructions stored on one or more computer-readable storage media used in accordance with embodiments of the invention; and FIG. 8 is a flowchart of a method of providing clustered non-unique results in a SERP, the instructions stored on one or more computer-readable storage media used in accordance with embodiments of the invention.

DETAILED DESCRIPTION

Figure 1:
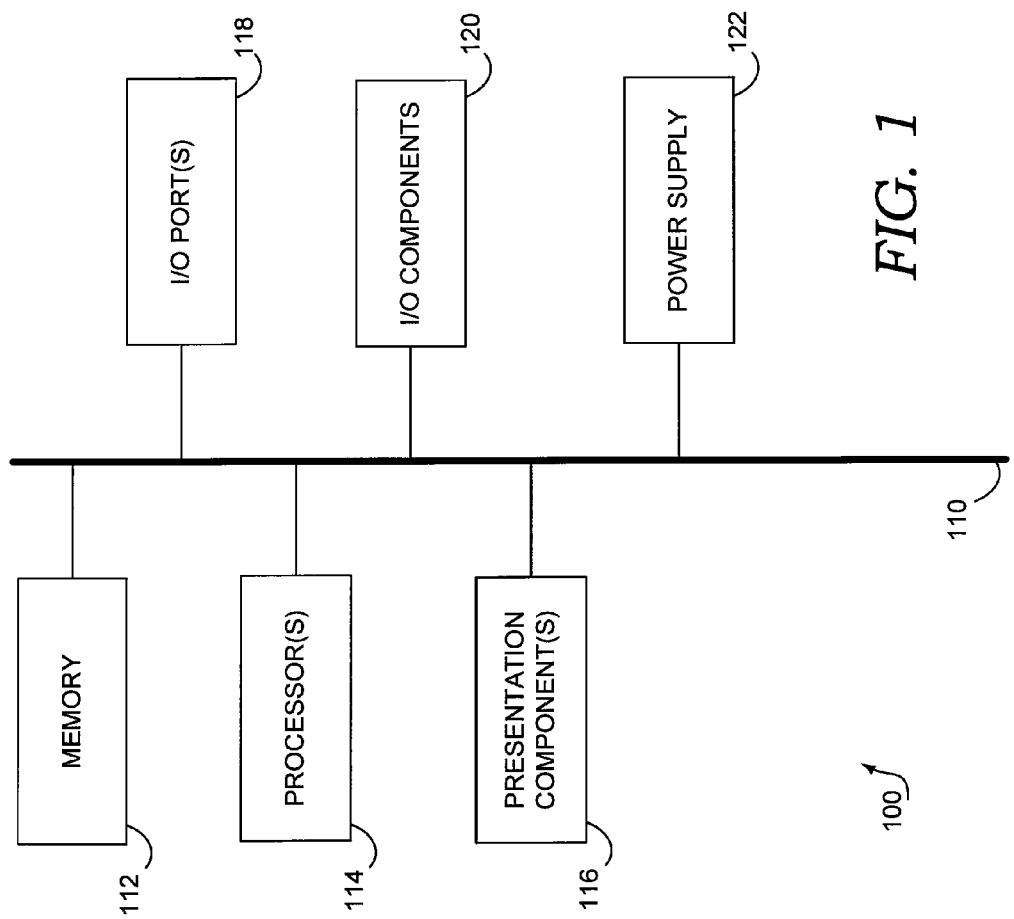
FIG. 1 is a schematic representation of an exemplary computer operating system used in accordance with embodiments of the invention.

Many news stories are not of interest to the general public shortly after the initial publication, such as one or two weeks later. In addition, if a news story is still of interest, it may have changed its focus somewhat from the initial news thrust. However, there are several instances in which an "old" news story regains interest, such as in light of a similar recent news story. For example, a recent major earthquake or tsunami is frequently compared to a prior earthquake or tsunami that occurred several weeks, months, or years prior to the recent event. Therefore, it would be advantageous to maintain the clusters of the former events for a longer period of time, such as throughout the life of the individual documents that make up a cluster.

When clusters are formed according to similar content, an identification (ID) number and associated attributes are assigned to each of the clusters. This provides a mechanism to track and retrieve the respective clusters for subsequent delivery of search results. The respective ID numbers of the clusters are maintained, even after the documents are no longer considered "fresh." These similar-content clusters are further subdivided according to publication date. This provides individual subdivided clusters for similar content events that occurred at different time spans. As an example, search results for three different plane crashes in China that occurred in 2002, 2006, and 2010 would be delivered as three different clusters, along with individual related search results in a SERP.

Embodiments of the invention provide systems, methods and computer-readable storage media for delivering clustered search results for recent and non-recent events. This detailed description and the following claims satisfy the applicable statutory requirements.

The terms "step," "block," etc. might be used herein to connote different acts of methods employed, but the terms should not be interpreted as implying any particular order, unless the order of individual steps, blocks, etc. is explicitly described. Likewise, the term "module," etc. might be used herein to connote different components of systems employed, but the terms should not be interpreted as implying any particular order, unless the order of individual modules, etc. is explicitly described.

Embodiments of the invention include, without limitation, methods, systems, and sets of computer-executable instructions embodied on one or more computer-readable media. Computer-readable media include both volatile and nonvolatile media, removable and non-removable media, and media readable by a database and various other network devices. By way of example and not limitation, computer-readable storage media comprise media implemented in any method or technology for storing information. Examples of stored information include computer-useable instructions, data structures, program modules, and other data representations. Media examples include, but are not limited to information-delivery media, random access memory (RAM), read-only memory (ROM), electrically erasable programmable read-only memory (EEPROM), flash memory or other memory technology, compact-disc read-only memory (CD-ROM), digital versatile discs (DVD), Blu-ray disc, holographic media or other optical disc storage, magnetic cassettes, magnetic tape, magnetic disk storage, and other magnetic storage devices. These examples of media can be configured to store data momentarily, temporarily, or permanently. The computer-readable media include cooperating or interconnected computer-readable media, which exist exclusively on a processing system or distributed among multiple interconnected processing systems that may be local to, or remote from, the processing system.

Embodiments of the invention may be described in the general context of computer code or machine-useable instructions, including computer-executable instructions such as program modules, being executed by a computing system, or other machine or machines. Generally, program modules including routines, programs, objects, components, data structures, and the like refer to code that perform particular tasks or implement particular data types. Embodiments described herein may be implemented using a variety of system configurations, including handheld devices, consumer electronics, general-purpose computers, more specialty computing devices, etc. Embodiments described herein may also be implemented in distributed computing environments, using remote-processing devices that are linked through a communications network, such as the Internet.

In some embodiments, a computer-implemented method of delivering search results of one or more events is described. A plurality of documents based on page content similarity are grouped to form one or more clusters. An identification (ID) number and respective related attributes are assigned to the one or more clusters. The assigned ID numbers and respective related attributes of the clusters are maintained after the plurality of documents are no longer considered to be fresh documents. The formed clusters are subdivided into one or more subdivided clusters according to publication date.

In other embodiments, one or more computer-readable storage media containing computer-readable instructions embodied thereon that, when executed by a computing device, perform a method of delivering persistent clusters in a search engine results page is described. Documents are retrieved from a database according to a received search query. Some of the retrieved documents are clustered into one or more clusters based on content similarity and publication date. An identification (ID) number is assigned to each of the clusters of retrieved documents, wherein the ID number of each of the clusters remains persistent throughout a life span of each of the clustered retrieved documents. The clusters are delivered along with other individual results in a search engine results page to a user interface in response to the received search query.

In yet other embodiments, one or more computer-readable storage media containing computer-readable instructions embodied thereon that, when executed by a computing device, perform a method of providing clustered non-unique results in a search engine results page is described. A plurality of documents are retrieved in response to a received user search query. A set number of top results are selected from the retrieved documents. The top results are grouped according to publication date or content similarity using one or more identification (ID) numbers of a respective one or more retrieved clusters. The search results are delivered to a user interface in response to the received user search query, where the search engine results page comprises the grouped top results.

Having briefly described a general overview of the embodiments herein, an exemplary computing system is described below. Referring to FIG. 1, an exemplary operating environment for implementing embodiments of the present invention is shown and designated generally as computing device 100. The computing device 100 is but one example of a suitable computing system and is not intended to suggest any limitation as to the scope of use or functionality of embodiments of the invention. Neither should the computing device 100 be interpreted as having any dependency or requirement relating to any one or combination of components illustrated. In one embodiment, the computing device 100 is a conventional computer (e.g., a personal computer or laptop), having processor, memory, and data storage subsystems. Embodiments of the invention are also applicable to a plurality of interconnected computing devices, such as computing devices 100 (e.g., wireless phone, personal digital assistant, or other handheld devices).

The computing device 100 includes a bus 110 that directly or indirectly couples the following devices: memory 112, one or more processors 114, one or more presentation components 116, input/output (I/O) ports 118, input/output components 120, and an illustrative power supply 122. The bus 110 represents what may be one or more busses (such as an address bus, data bus, or combination thereof). Although the various blocks of FIG. 1 are shown with lines for the sake of clarity, delineating various components in reality is not so clear, and metaphorically, the lines would more accurately be gray and fuzzy. For example, one may consider a presentation component 116 such as a display device to be an I/O component 120. Also, processors 114 have memory 112. It will be understood by those skilled in the art that such is the nature of the art, and as previously mentioned, the diagram of FIG. 1 is merely illustrative of an exemplary computing device that can be used in connection with one or more embodiments of the invention. Distinction is not made between such categories as "workstation," "server," "laptop," "handheld device," etc., as all are contemplated within the scope of FIG. 1, and are referenced as "computing device" or "computing system."

The components described above in relation to the computing device 100 may also be included in a wireless device. A wireless device, as described herein, refers to any type of wireless phone, handheld device, personal digital assistant (PDA), BlackBerry®, smartphone, digital camera, or other mobile devices (aside from a laptop), which communicate wirelessly. One skilled in the art will appreciate that wireless devices will also include a processor and computer-storage media, which perform various functions. Embodiments described herein are applicable to both a computing device and a wireless device. In embodiments, computing devices can also refer to devices which run applications of which images are captured by the camera in a wireless device.

The computing system described above is configured to be used with the several computer-implemented methods, systems, and media for delivering persistent clusters in a search engine results page, generally described above and described in more detail hereinafter.

Figure 2:
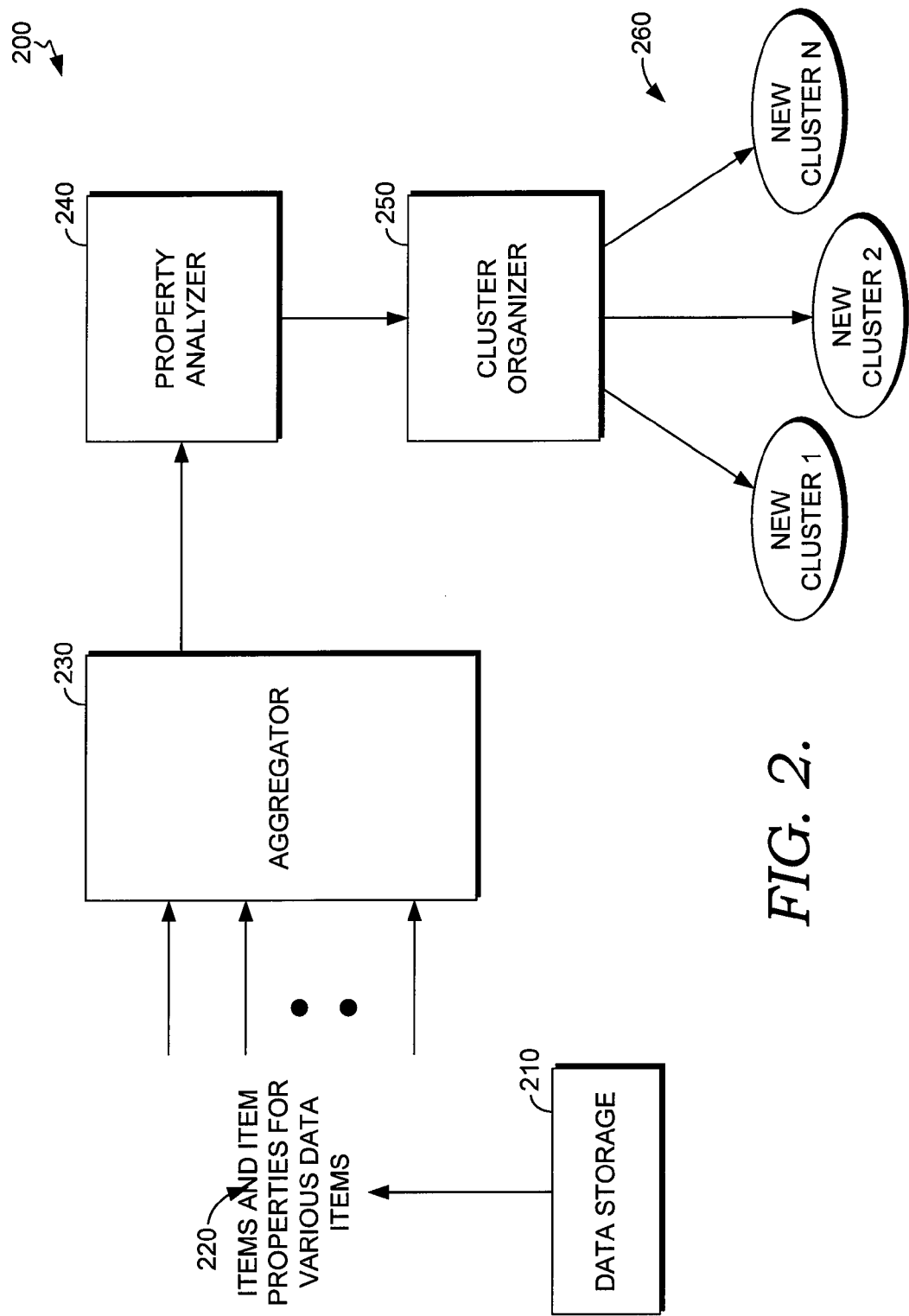
FIG. 2 is a schematic representation of a query clustering system used in accordance with embodiments of the invention.

FIG. 2 is an illustration of a query clustering system 200 in accordance with embodiments of the invention. The system 200 includes a data storage 210 that stores a plurality of data items 220 to be displayed at a user interface (not shown). Such data items 220 can include documents, files, folders, images, audio files, source code and so forth that can appear in various viewable states at the user interface. The data items 220 are also associated with various properties, such as metadata that describes such aspects as an item's type (e.g. image, document, spreadsheet, binary, and so forth), date created, people associated with the item, location, category, user-defined property, and so forth. An aggregator 230 collects the data items 220 and associated properties and presents the items to a property analyzer 240 that performs an analysis of respective items and properties. For example, such analysis can include automatically determining a score for various possible clustering scenarios or potential groupings for items.

Based upon the analysis by the analyzer 240, a cluster organizer 250 presents an optimized grouping of new clusters 260 to a user. The optimized grouping of clusters 260 facilitates finding and retrieving desired information from the data storage 210 which can include local storage mediums, remote storage mediums, or a combination of local and remote storage.

Figure 3:
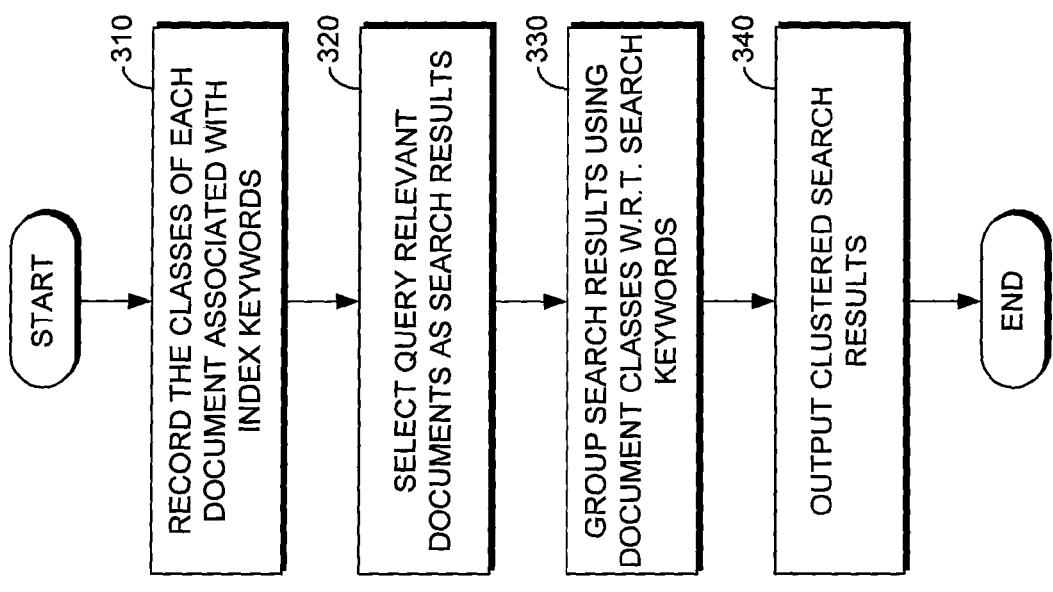
FIG. 3 is a flowchart of a representative query clustering process used in accordance with embodiments of the invention.

FIG. 3 is a flowchart of an exemplary process for clustering search results using a system, such as the system 200 described above with reference to FIG. 2. The search results are generated with a document retrieval system. The classes of each indexed document associated with each of its index keywords are recorded, in step 310. The classes may include all the possible classes (or the most relevant or the most frequently used classes) of the document when it is searched and indexed with each specific index keyword. The processing generates the search results in response to a search query by selecting and ranking a set of documents that are relevant to the search query in step 320. Step 320 can be executed by using an inverted index, as an example. The search query usually contains a certain number of keywords, which are submitted with a search request from a searcher using a computing device or a computer network, such as the computing device described with reference to FIG. 1 above.

The search results are grouped into a certain number of document clusters in step 330. The document clusters can be grouped by Keyword Association Clustering Classes (KWAC), as an example. Each result document is put into each of its classes associated with each of the search keywords, and the union of all the classes of the result documents may be used to construct the final document clusters for the search results. The clusters are ranked according to the ranks of documents included in each cluster and the associative weights of the clustered documents with the corresponding cluster, such that clusters with higher ranks and documents with higher ranks in each of the clusters are identified first. Clustered search results are organized for display and delivered to the user in step 340.

The query clustering system illustrated in FIG. 2 and the process for clustering search results illustrated in FIG. 3 is just one exemplary system and method that can be used with embodiments of the invention. Several other systems and methods of clustering query results are contemplated within the scope of the invention.

Figure 4:
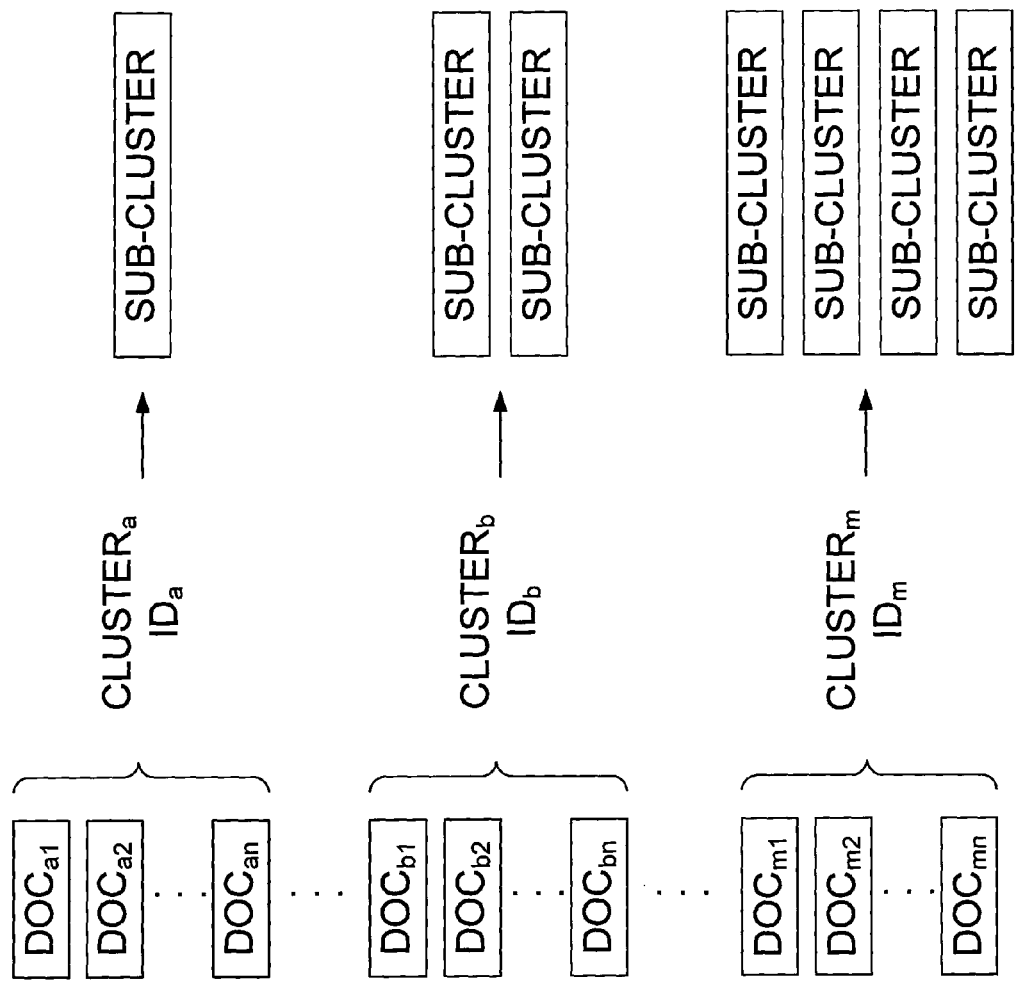
FIG. 4 is an illustration of cluster and sub-cluster formation used in accordance with embodiments of the invention.

FIG. 4 illustrates a system and process in which multiple documents are grouped into clusters, which can be implemented using the clustering system and method described above with reference to FIGS. 2 and 3, respectively. At the top of FIG. 4, a plurality of documents, labeled as $a_1, a_2 \ldots a_n$ are grouped according to content to form a $cluster_a$. $Cluster_a$ is identified with an identification number, $ID_a$. The plurality of documents in $cluster_a$ are then further grouped or divided according to publication date, to form one or more subdivided clusters.

The following example is given to illustrate the use and advantage of forming clusters and subdivided clusters. Suppose that a received user query contained the words, [royal wedding]. Several results would be returned, wherein most of the results would pertain to the recent 2011 royal wedding of William and Kate, but there could also be results returned from the royal wedding of Charles and Diana that took place thirty years earlier. The royal wedding of William and Kate would have been clustered shortly after the event, and traditionally, would remain clustered for a period of 2-4 weeks or for approximately one month, for example. Recently produced documents, such as documents produced within the last 2-4 weeks or within the last month, are referred to as fresh documents. Using traditional approaches, after the documents are no longer considered to be fresh documents, the associated cluster ceases to exist, and the results containing those non-fresh documents for the two royal weddings would be intertwined and presented as individual, non-clustered results. However, with the use of persistent ID numbers in accordance with embodiments of the present invention, the content-related cluster, e.g. [royal wedding] search results, can be maintained and further divided into additional categories, such as publication date. The persistent clusters are in addition to any newly formed clusters. In the example just illustrated, there would likely be two subdivided clusters in the [royal wedding] search results—one for the royal wedding of William and Kate, and a second subdivided cluster for the royal wedding of Charles and Diana.

FIG. 4 further illustrates that a received search query could result in returning a second cluster of documents, illustrated as $b_1, b_2 \ldots b_n$, to form $cluster_b$ with an identification number, $ID_b$. $Cluster_b$ is formed according to a similar content within the documents, $b_1, b_2 \ldots b_n$. The documents contained in $cluster_b$ are then grouped or divided according to publication date to form one or more subdivided clusters.

$Cluster_m$ is also formed from the similar content of retrieved documents, $m_1, m_2 \ldots m_n$, with an identification number of $ID_m$, which is then divided into one or more subdivided clusters according to publication date. Any number of clusters or subdivided clusters could be formed, depending upon the content of the received search query. FIG. 4 also illustrates that certain clusters may contain just one subdivided cluster, wherein all of the clustered documents pertain to the same time span, whereas other clusters could be divided into various multiple subdivided clusters.

Figure 5:
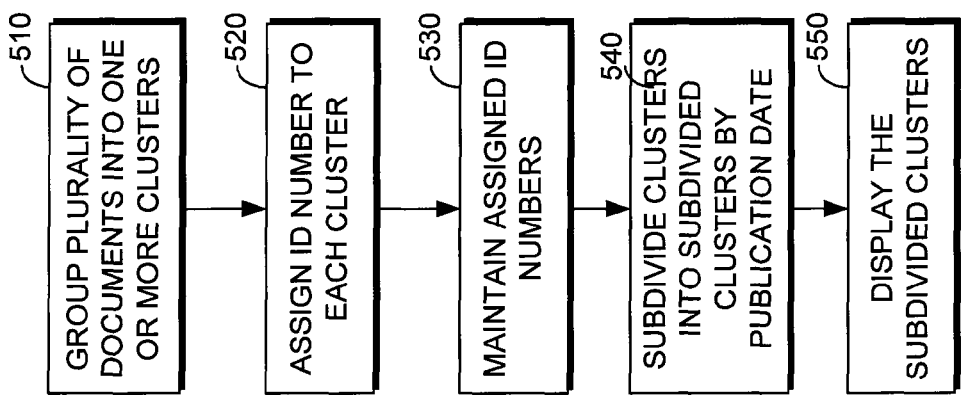
FIG. 5 is a flowchart of a computer-implemented method of delivering search results used in accordance with embodiments of the invention.

FIG. 5 illustrates a flow diagram for a computer-implemented method of delivering search results of one or more events. A plurality of documents are retrieved in response to a received search query. The documents can comprise fresh documents, non-fresh documents such as non-recent documents, or a combination of both. Those retrieved documents that contain similar or related content are grouped into one or more clusters at the time of the search query in step 510. An alternative embodiment provides clustering to occur at the time the documents are indexed, independent of the time of the search query. Any number of clusters can be formed, but many of the retrieved documents may remain as individual documents that are not clustered with other documents. Each of the formed clusters is assigned an identification (ID) number in step 520. Each ID number may have attributes associated with it, which enables tracking of that particular cluster after it has been previously formed.

The assigned ID numbers for the clusters are maintained in step 530 and therefore, remain persistent throughout the lifetime of each particular document, or for any other designated time period. In traditional approaches to clustering search results, clustering is typically performed for fresh documents only. Therefore, the clusters no longer exist after the documents are no longer considered to be at a peak of popularity, i.e. "fresh." This time period could vary, but an example of a fresh document life span is about 2-4 weeks, or approximately one month. The ID number for a particular cluster would typically expire at the end of the "fresh" life span, and that cluster would cease to exist. However, by maintaining the ID number and its associated attributes in accordance with embodiments of the present invention, the cluster is also maintained beyond the "fresh" life span. An embodiment of the invention maintains the ID number of the cluster for the entire normal life span of its documents. As an example for illustrative purposes only, consider the numerous volcanoes that occur in the Hawaiian Islands. An exemplary query might include two common keywords or phrases of, "Hawaiian Islands" and "volcanoes." Using embodiments of the invention, the related query results would be further divided into the time periods during which each event occurred. An additional embodiment would maintain these time-relevant clusters throughout the life span of the respective documents.

Embodiments of the invention also enable persistent clustering of existing "old" documents that are not presently clustered. This could be the result of expired clusters or no previous clustering implemented.

Any previously formed clusters, as well as newly formed clusters from retrieved documents, are divided into subdivided clusters according to publication date in step 540. This subdivision allows for finer grouping of temporally related events on a particular cluster. The clustering algorithm groups the documents by ID number and then publication date. The subdivided clusters are then delivered to a user interface to provide a more consistent experience to the user and to allow for more diversity through the display of other individual non-clustered results in step 550.

FIG. 6 illustrates a display on a user interface of a search engine results page (SERP), which contains two subdivided clusters. In the displayed example, a search query containing the keywords China, plane, and crash was implemented. Since the retrieved documents contain multiple documents covering two different plane crashes in China, the returned results include two subdivided clusters for the two different plane crashes, rather than all of the relevant documents combined into just one cluster, or no cluster at all, since these are "old" documents. Each subdivided cluster display gives a thumbnail synopsis of that particular subdivided cluster, with links to the documents contained within the subdivided cluster. A thumbnail synopsis provides a summary of the content within the subdivided cluster. Embodiments of the invention of a subdivided cluster synopsis contain one or more features, such as a dominant title, a dominant image, a dominant news summary, or an image depicting the subdivided cluster event. The subdivided cluster synopsis may also contain the number of documents within the subdivided cluster, a host domain, or one or more dominant features of the subdivided cluster.

FIG. 7 illustrates a flow diagram for a method of delivering persistent clusters in a search engine results page (SERP), the computer-readable instructions for which are embodied on one or more computer-readable storage media. Multiple documents are retrieved from a database in response to a search query at the time of the search query in step 710. An alternative embodiment provides clustering to occur at the time the documents are indexed, independent of the time of the search query. The content of each retrieved document is analyzed to determine if some of the retrieved documents should be clustered based on content similarity or publication date, or both in step 720. Each cluster will contain the associated Uniform Resource Locators (URLs) for each retrieved document. The number of documents with similar content that would warrant forming a cluster will vary. A threshold number of documents could be previously established, which would trigger formation of a cluster. An identification (ID) number is assigned to each cluster in step 730. The ID number has cluster attributes associated with it for subsequent tracking and retrieval of that cluster. The formed clusters and individual non-clustered retrieved documents are delivered to a user interface in a SERP in step 740. A thumbnail synopsis of each delivered cluster is also displayed in step 750. A thumbnail synopsis of each cluster will give an overall summary or view of the cluster contents.

FIG. 8 illustrates a flow diagram for a method of providing clustered non-unique results in a search engine results page (SERP), the computer-readable instructions for which are embodied on one or more computer-readable storage media. Documents are retrieved by a search engine in response to an inputted search query at the time of the search query in step 810. An alternative embodiment provides clustering to occur at the time the documents are indexed, independent of the time of the search query. A set number of the top results are selected in step 820. The set number could be a configurable number, such as more than ten documents. The set number can vary based upon certain considerations, such as system resources. The selected top results are grouped according to publication date or content similarity by tracking the ID numbers of previously formed clusters in step 830. The results of retrieved clusters and retrieved individual documents of the selected top results are delivered to a user interface in step 840. The results may also contain newly formed clusters. The clustered results can contain fresh documents, as well as documents that are no longer considered to be fresh documents.

Forming subdivided clusters by publication date can have the advantage of forming natural divisions within the main cluster. FIG. 6 illustrates this point, where different timelines naturally separated the [China, plane, crash] search query results into two different plane crash results. Another example could occur for a particular chain of events, such as a major earthquake or tornado. The initial cluster could be the actual destruction, a second cluster could be search and rescue missions, a third cluster could be temporary housing set up, a fourth cluster could be debris removal, and a fifth cluster could be rebuilding efforts. In addition, an initial cluster may become very large, and could be subsequently subdivided into smaller clusters. News research efforts would certainly be expedited if former news documents remained clustered throughout the documents' lives, instead of remaining intact for only a short period of time.

Many different arrangements of the various components depicted, as well as embodiments not shown, are possible without departing from the spirit and scope of the invention. Embodiments of the invention have been described with the intent to be illustrative rather than restrictive.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A computer-implemented method of delivering search results of one or more events using a computing device having processor, memory, and data storage subsystems, the computer-implemented method comprising:
    providing a plurality of documents, wherein the plurality of documents includes fresh documents and non-fresh documents, wherein fresh documents have life spans falling within a predetermined period of time, and wherein non-fresh documents have life spans exceeding the predetermined period of time;
    grouping the plurality of documents based on page content similarity to form one or more clusters;
    assigning an identification (ID) number and one or more respective related attributes to each of the one or more clusters;
    maintaining the assigned ID numbers and the respective related attributes for each of the one or more clusters after the plurality of documents are no longer considered to be fresh documents; and
    subdividing each of the one or more clusters into one or more subdivided clusters according to publication date.

2. The computer-implemented method of claim 1, wherein grouping a plurality of documents comprises grouping a plurality of fresh documents.

3. The computer-implemented method of claim 1, wherein grouping a plurality of documents comprises grouping a plurality of non-recent event documents.

4. The computer-implemented method of claim 1, wherein the assigned ID numbers remain persistent throughout a lifetime of each respective document's life.

5. The computer-implemented method of claim 1, wherein each of the plurality of documents are considered to be a fresh document for approximately a one-month life span.

6. The computer-implemented method of claim 1, further comprising: displaying the one or more subdivided clusters by publication date for one of the one or more clusters to a user interface of the computing device in response to a user search query.

7. The computer-implemented method of claim 6, wherein displaying each of the one or more subdivided clusters comprises displaying a respective one or more of: a dominant title, a dominant image, or a dominant news summary.

8. The computer-implemented method of claim 1, wherein the one or more subdivided clusters comprise grouped Uniform Resource Locators (URLs) according to respective ID numbers of the one or more subdivided clusters.

9. One or more computer-readable storage media storing computer-readable instructions embodied thereon that, when executed by a computing device, perform a method of delivering persistent clusters in a search engine results page, the method comprising:
    retrieving documents from a database according to a received search query;
    clustering some of the retrieved documents into one or more clusters based on content similarity and publication date;
    assigning an identification (ID) number to each of the clusters of the retrieved documents, wherein the ID number of each of the clusters remains persistent throughout a life span of each of the clustered retrieved documents; and
    delivering each of the clusters with other individual non-clustered results in the search engine results page to a user interface in response to the received search query.

10. The one or more computer-readable storage media of claim 9, wherein some of the one or more clusters comprise retrieved documents that are fresh documents.

11. The one or more computer-readable storage media of claim 9, wherein some of the one or more clusters comprise retrieved documents that are not fresh documents.

12. The one or more computer-readable storage media of claim 9, wherein the one or more clusters comprise one or more grouped Uniform Resource Locators (URLs).

13. The one or more computer-readable storage media of claim 9, further comprising: providing a thumbnail synopsis for each of the one or more clusters.

14. The one or more computer-readable storage media of claim 13, wherein the thumbnail synopsis comprises one or more of: a number of documents, a host domain, or one or more dominant features for each of the one or more clusters.

15. One or more computer-readable storage media storing computer-readable instructions embodied thereon that, when executed by a computing device, perform a method of providing clustered non-unique results in a search engine results page, the method comprising:
    providing a plurality of documents comprising fresh documents that have life spans falling within a predetermined period of time;
    grouping the fresh documents based on page content similarity to form one or more clusters;
    assigning an identification (ID) number and one or more respective related attributes to each of the one or more clusters;
    maintaining the assigned ID numbers and the respective related attributes for each of the one or more clusters after the clustered documents are no longer considered to be fresh documents, wherein the clustered documents are no longer considered to be fresh documents when their life spans exceed the predetermined period of time;
    retrieving a set of documents from the plurality of documents in response to a received user search query, wherein the set of documents includes
        A) fresh documents having life spans falling within a predetermined period of time, and
        B) non-fresh documents having life spans exceeding the predetermined period of time,
    wherein each document in the retrieved set of documents is associated with one or more of the ID numbers assigned to the clusters, regardless of whether the document is a fresh document or a non-fresh document;
    selecting a set number of top results from the retrieved set of documents;
    grouping the top results according to publication date or content similarity using one or more of the ID numbers of one or more respective retrieved clusters; and
    delivering search results to a user interface in response to the received user search query, the search engine results page comprising the grouped top results.

16. The one or more computer-readable storage media of claim 15, wherein the one or more ID numbers persist throughout a document life span for the associated one or more retrieved clusters.

17. The one or more computer-readable storage media of claim 15, wherein the search engine results page comprises clustered results and non-clustered results.

18. The one or more computer-readable storage media of claim 17, wherein the clustered results comprise newly formed clustered results.

19. The one or more computer-readable storage media of claim 15, wherein the grouping is executed via a clustering algorithm.

\* \* \* \* \*